United States Patent
Andral

(10) Patent No.: US 11,636,474 B2
(45) Date of Patent: Apr. 25, 2023

(54) SYSTEM AND METHOD FOR IMPLEMENTING A KEY-CODE BASED MONEY TRANSFER

(71) Applicant: Visa International Service Association, San Francisco, CA (US)

(72) Inventor: Vladimir Andral, Bellevue, WA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 0 days.

(21) Appl. No.: 17/324,100

(22) Filed: May 18, 2021

(65) Prior Publication Data

US 2022/0374878 A1 Nov. 24, 2022

(51) Int. Cl.
*G06Q 20/38* (2012.01)
*G06Q 20/40* (2012.01)
*G06Q 20/32* (2012.01)

(52) U.S. Cl.
CPC ....... *G06Q 20/385* (2013.01); *G06Q 20/3223* (2013.01); *G06Q 20/40145* (2013.01)

(58) Field of Classification Search
None
See application file for complete search history.

(56) References Cited

U.S. PATENT DOCUMENTS

| | | | |
|---|---|---|---|
| 10,482,449 B1 * | 11/2019 | Gantert | G06Q 20/3274 |
| 2007/0255652 A1 | 11/2007 | Tumminaro et al. | |
| 2011/0246328 A1 * | 10/2011 | Dunwoody | G06Q 20/105 705/41 |
| 2011/0270695 A1 | 11/2011 | Jones et al. | |
| 2014/0310171 A1 * | 10/2014 | Grossman | G06Q 20/384 705/44 |
| 2016/0012465 A1 | 1/2016 | Sharp | |
| 2017/0169401 A1 * | 6/2017 | Beane | H04W 24/00 |
| 2018/0096323 A1 | 4/2018 | Baber et al. | |
| 2020/0013028 A1 | 1/2020 | Black et al. | |

OTHER PUBLICATIONS

Mire,Sam, https://www.disruptordaily.com/blockchain-startups-payments/, "Payments on the Blockchain: 29 Startups to Watch in 2019", Jan. 28, 2019.

\* cited by examiner

*Primary Examiner* — Namrata Boveja
*Assistant Examiner* — Amit Patel
(74) *Attorney, Agent, or Firm* — Buckley Patent Law LLC/VISA; Timothy Emmanuel Buckley

(57) ABSTRACT

A system includes a processor and a non-transitory computer readable medium coupled to the processor. The non-transitory computer readable medium comprises code that when executed by the processor, causes the processor to receive a money transfer amount indicative of an amount of funds to be transferred to a recipient. The processor generates a key code associated with the money transfer amount that is provided to a user of the system and given to the recipient by the user. The key code is programmed by the processor to enable the recipient to use the key code to redeem the amount of funds associated with the money transfer amount.

7 Claims, 3 Drawing Sheets

SYSTEM AND METHOD FOR IMPLEMENTING A KEY-CODE BASED MONEY TRANSFER

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Customers that utilize traditional payment systems often seek to provide gratuities to an employee of a merchant. However, many of the customers do not have immediate access to cash to provide the gratuity instantaneously to the employee. In addition, traditional payment transfer products generally require the employee to have immediate access to a mobile device to receive a fund transfer, which may not be possible to due to nature of the employee's employment. As a result, the customer may not be able to provide the employee with a well-earned gratuity or may simply forget to do so. Therefore, a need exists to enable customers to provide a gratuity or donation to the employee of a merchant or other individual.

DETAILED DESCRIPTION

Figure 1:
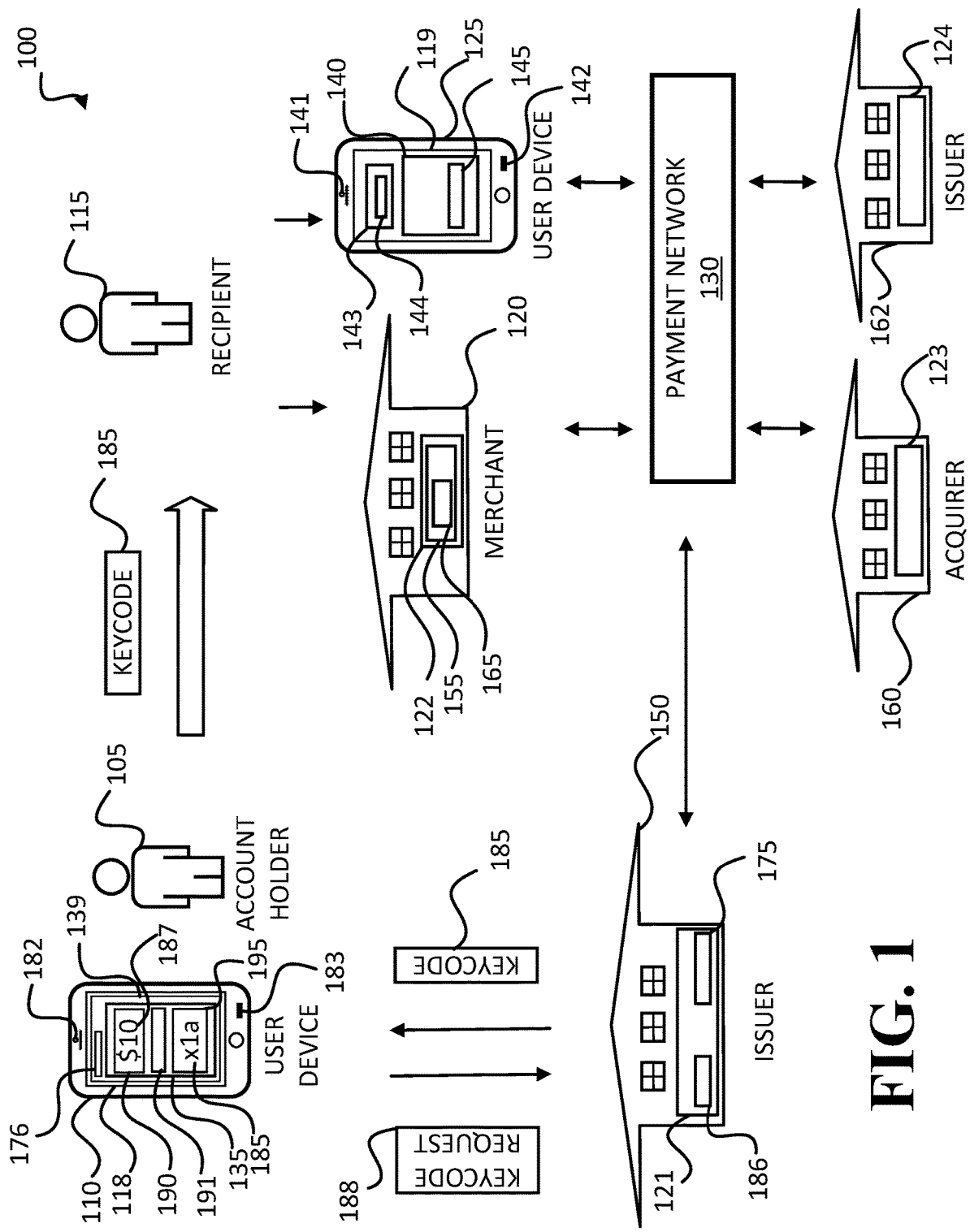
FIG. 1 is a block diagram illustrating a money transfer system in accordance with some embodiments.
Figure 2:
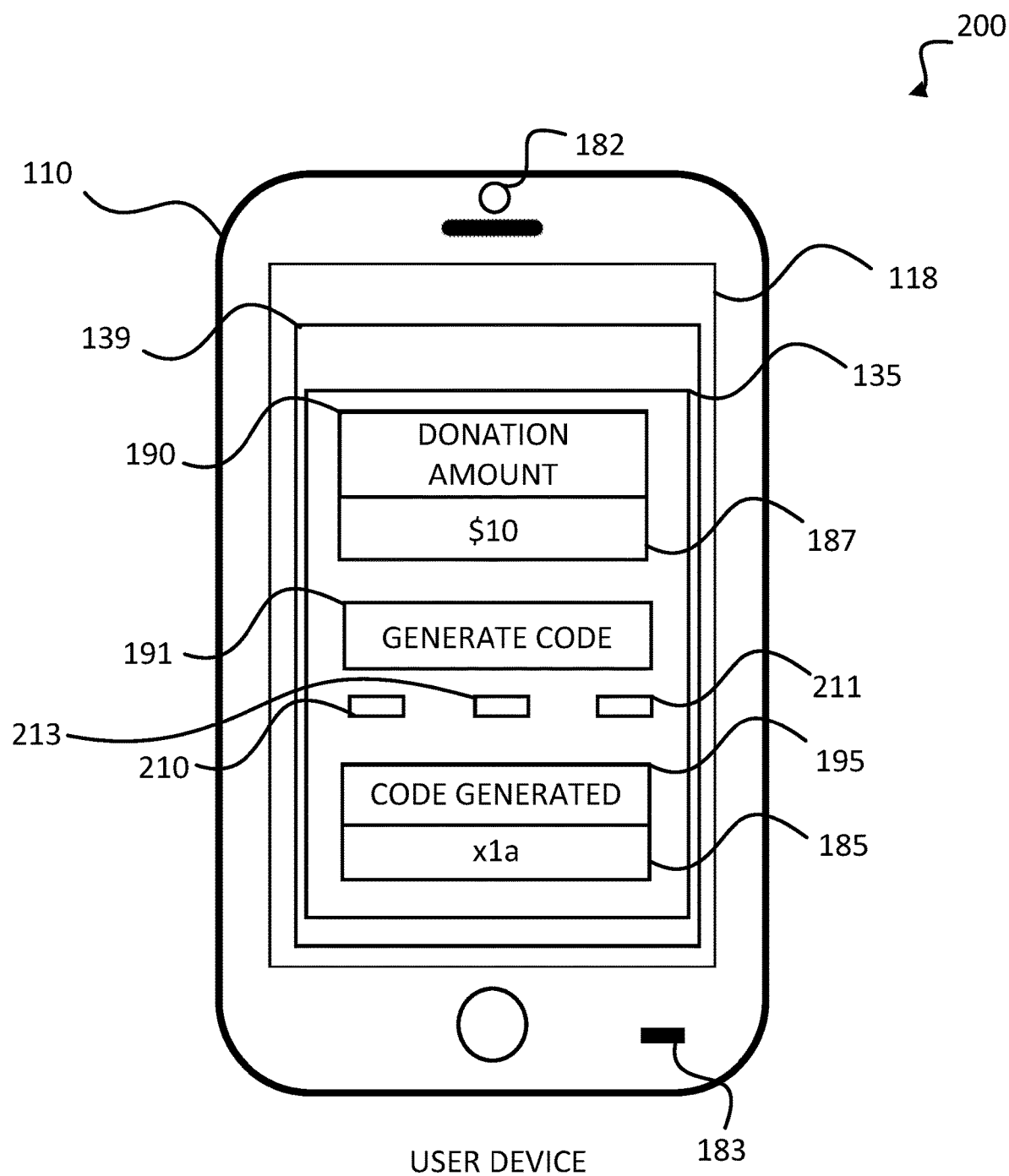
FIG. 2 is an illustration of a user device associated with the money transfer system in FIG. 1 in accordance with some embodiments.
Figure 3:
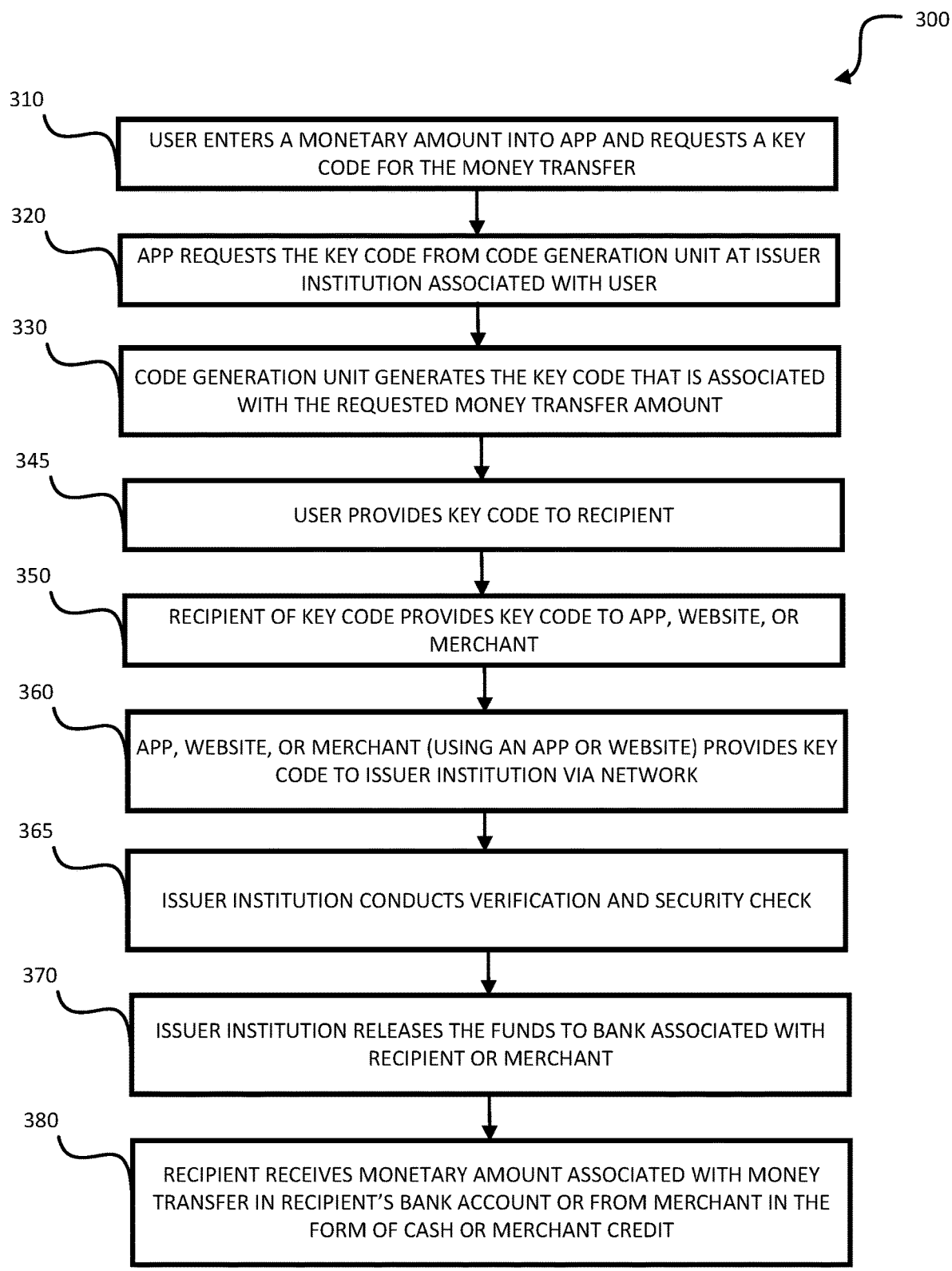
FIG. 3 is a flow diagram illustrating a method for performing the key-code based money transfer techniques of FIG. 1 in accordance with some embodiments.

FIGS. 1-3 illustrate systems and techniques that allow a user of a computing device to transfer a monetary amount to a recipient using a key code in accordance with some embodiments. In some embodiments, at the request of the user of the computing device to, for example, transfer or donate a monetary amount to the recipient, a key code is generated by an issuer institution associated with the user for view by the user at the computing device. In some embodiments, for increased security, the key code may be associated with a photo, voice recording, or other biometric data of the recipient and a private key known only to the issuer institution. In some embodiments, the user provides the key code to the recipient, either verbally or via text, and the recipient redeems the monetary amount by inputting the key code into a software application (App) or a key-code application website on a user device of the recipient, or by providing the key code to a participating merchant, who inputs the key code into the merchant's App or key-code application website. In some embodiments, when the recipient provides the key code to the App or the key-code application website to redeem the monetary amount, the App or key-code application website provides the key code to the issuer institution associated with the user via a payment network that verifies the authenticity of the key code. Upon verification by the issuer institution, the App or key-code application website requests banking information, such as, for example, credit card or debit card information, from the recipient and the monetary amount is provided to the credit card, debit card, or bank account that is associated with the recipient.

In some embodiments, when the recipient provides the key code to the merchant to redeem the monetary amount, the merchant inputs the key code into the merchant's App or key-code application website. In some embodiments, the merchant's App or key-code application website provides the key code to the issuer institution associated with the user via a payment network that verifies the authenticity of the key code. Upon verification, the monetary amount is provided to the bank account associated with the merchant and the monetary amount is redeemed from the merchant by the recipient. The merchant subsequently provides the recipient with either cash, a cash equivalent, or merchant credit whose value is equivalent to the monetary amount. In some embodiments, the key-code based money transfer system improves upon existing money transfer techniques in that when, for example, the user of the computing device does not have immediate access to cash, the user only has to give a key code to the recipient in order for the recipient to redeem the cash or cash equivalent from the user.

As used herein, the term "account data," refers to any data concerning one or more accounts for one or more users. Account data may include, for example, one or more account identifiers, user identifiers, transaction histories, balances, credit limits, issuer institution identifiers, and/or the like. As used herein, the term "account identifier" may include one or more types of identifiers associated with a user account (e.g., a PAN, a primary account number, a card number, a payment card number, a token, and/or the like). In some non-limiting embodiments, an issuer institution may provide an account identifier (e.g., a PAN, a token, and/or the like) to a user that uniquely identifies one or more accounts associated with that user. The account identifier may be embodied on a payment device (e.g., a portable payment instrument, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the term "acquirer" or "acquirer institution" may refer to an entity licensed and/or approved by the transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/orthe like). In some non-limiting embodiments, an acquirer institution may be a financial institution, such as a bank. In some non-limiting embodiments, as used herein, the term "acquirer system" may refer to one or more computer systems, computer devices, software applications, and/or the like operated by or on behalf of an acquirer institution.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. It will be appreciated that numerous other arrangements are possible.

As used herein, the term "computing device" or "communication device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer. As used herein, the term "user interface" or "graphical user interface" refers to a generated display, such as one or more graphical user interfaces (GUIs) with which a user may interact, either directly or indirectly (e.g., through a keyboard, mouse, touchscreen, etc.).

As used herein, the term "issuer institution" or "issuer host" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a payment device, such as a physical financial instrument, e.g., a payment card, and/or may be electronic and used for electronic payments.

In some embodiments, the term "issuer system" refers to one or more computer systems operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. As used herein, the term "merchant system" may refer to one or more computer systems operated by or on behalf of a merchant, such as a server computer executing one or more software applications.

As used herein, the term "point-of-sale (POS) system," may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "payment device" may refer to a payment card (e.g., a credit or debit card), a gift card, a smartcard, smart media, a payroll card, a healthcare card, a wristband, a machine-readable medium containing account data, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of payment devices managed by a transaction service provider. As used herein, the term "payment gateway system" may refer to one or more computer systems, computer devices, servers, groups of servers, and/or the like operated by or on behalf of a payment gateway.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

FIG. 1 illustrates a money transfer system 100 that supports a key-code based money transfer in accordance with some embodiments. In some embodiments, the money transfer system 100 may be, for example, a peer-to-peer money transfer system that utilizes blockchain to store the financial transactions generated using the key-code based money transfer techniques described herein. Money transfer system 100 includes a user device 110, an issuer institution 150, an acquirer institution 160, a payment network 130, a merchant 120, an issuer institution 162, and a user device 125. In some embodiments, user device 110 and user device 125 are computing devices or communication devices that may be, for example, mobile phones, tablets, computers, or the like, that are used to initiate the key-code based money transfer or redeem the funds associated with the key-code based money transfer. User device 110 and user device 125 include a touch screen 118 and a touch screen 119, respectively, that support various data input fields for the key-code based money transfer. In some embodiments, user device 110 includes a camera 182, a voice recorder 183, and application software (App) 139 configured to execute the key-code based money transfer of a monetary amount 187 from user 105 to recipient 115. Similarly, in some embodiments, user device 125 includes a camera 141, a voice recorder 142, a key-code application website 143, and application software (App) 140 configured to redeem the monetary amount 187 using key-code based money transfer from user 105 to recipient 115.

In some embodiments, issuer institution 150 includes an issuer system 121 that utilizes a code generation unit 175 configured to generate a key code 185 for use by recipient 115 to redeem the monetary amount 187 from user 105. In some embodiments, App 139 of user device 110 includes a code generation unit 176 configured to generate key code 185 for use by recipient 115 to redeem the monetary amount 187 from user 105. In some embodiments, code generation unit 175 and code generation unit 176 are software or electronic hardware components configured to utilize a public key and/or photos, voice, or other biometric data of recipient 115 (discussed further below with respect to FIG. 1 and FIG. 2) to generate the key code 185. In some embodiments, code generation unit 176 performs operations similar to code generation unit 175, except that code generation unit 176 is located at user device 110, instead of being located at issuer system 121. In some embodiments, acquirer institution 160, which may operate as a financial institution for merchant 120, includes an acquirer system 123 that is configured to perform payment transactions for merchant 120 that allow recipient 115 to ascertain monetary amount 187 from merchant 120. In some embodiments, issuer institution 162, which may operate as a financial institution for recipient 115, includes an issuer system 124 that is configured to perform payment transactions for recipient 115 that allow recipient 115 to access the monetary amount 187 provided by user 105. In some embodiments, merchant 120 includes a merchant system 122 that is configured to utilize software applications to allow merchant 120 to input key code 185 and/or other secured-verification enhancements (described below with reference to FIGS. 1 and 2) that allow recipient 115 to redeem the monetary amount 187. In some embodiments, payment network 130 is a transaction service provider (such as Visa® or any other entity that processes transactions) that receives transaction authorization requests from merchant 120 and/or user device 125 and provides guarantees of payment of the monetary amount 187 for issuer institution 150.

In some embodiments, in operation, user 105 initiates the key-code based money transfer by selecting and logging into App 139 on touch screen 118 via a secure sign-on on user device 110. Upon selection of App 139, App 139 generates an application display 135 on touch screen 118 that is configured to allow the user 105 to input a monetary amount 187 and generate an associated key code 185. The key code 185 is used by recipient 115 to redeem the associated monetary amount 187.

In some embodiments, the application display 135 (described further below with reference to FIG. 2) includes a monetary amount field 190, a generate code button 191, and a key code display 195. The monetary amount field 190 is configured to allow the entry of the monetary amount 187 requested by user 105. The generate code button 191 is configured to allow the user 105 to initiate the generation of the key code 185 for use by the recipient 115 to redeem monetary amount allocated by user 105 for recipient 115. The key code display 195 is configured to display the key code 185 generated by the code generation unit 175 of issuer system 121 that is used by recipient 115 to redeem the monetary amount 187.

In some embodiments, the monetary amount field 190 that is displayed in application display 135 allows the user 105 to input the monetary amount 187 (e.g., $10.00, $20.00, $100.00, etc.) representative of a specific money transfer amount that the user 105 elects to transfer or donate to recipient 115. In some embodiments, a plurality of pre-defined monetary amounts may be preprogrammed by user 105 or App 139 to allow the user 105 to select from a pre-defined plurality of monetary amounts. For example, the pre-defined plurality of monetary amounts may include a first monetary amount (e.g., $10.00), a second monetary amount (e.g., $20.00), a third monetary amount (e.g., $100.00), or other pre-defined monetary amount that the user 105 elects to pre-program into App 139 of user device 110. In some embodiments, the pre-defined monetary amounts improve upon existing money transfer systems by, for example, expediting the monetary transfer or donation process to reduce the amount time required to transfer funds, e.g., a cash tip or cash tip equivalent, to recipient 115. In some embodiments, the plurality of pre-defined monetary amounts are associated with a plurality of key codes 185 that are configured to execute the key-code based money transfer as described further below. In some embodiments, the monetary amount 187 selected may be in the form of cash, credit, bitcoin, or other currency. In some embodiments, the monetary amount 187 is provided by the user 105 to recipient 115 as a "tip" amount or donation amount for services rendered. In some embodiments, the recipient 115 may select the type of currency upon disbursement of the monetary amount 187, e.g., in the form of cash, credit, bitcoin, or other currency. In some embodiments, the type of currency in monetary amount 187 may be indicated by a currency identifier, such as, for example, $, €, or £ whose selection depends on the type of currency the user 105 or recipient 115 requests.

In some embodiments, after the user 105 has input the monetary amount 187 into monetary amount field 190, user 105 selects the generate code button 191 of App 139 that generates a key code request 188. In some embodiments, the key code request 188 is configured to signal to App 139 or issuer system 121 to generate the key code 185 associated with the monetary amount 187. In some embodiments, the key code request 188 is transmitted to code generation unit 175 of the issuer system 121 of issuer institution 150.

In some embodiments, code generation unit 175 of the issuer system 121 receives the key code request 188 from App 139 and, in response, generates the key code 185 and provides the key code 185 to key code display 195 of App 139. In some embodiments, the key code 185 generated by the code generation unit 175 is configured to allow recipient 115 to redeem the monetary amount 187 associated with the key code request 188 from merchant 120 or issuer institution 162 via App 140 or key-code application website 143. In some embodiments, the key code 185 is associated with the monetary amount 187 and the specific user device 110 utilized by user 105 to create the key code request 188. In some embodiments, the key code 185 generated by the issuer institution 150 is akin to a password that hash maps to a private key known only to issuer institution 150. In some embodiments, code generation unit 175 of the issuer system 121 provides the key code 185 to key code display 195 of App 139.

In some embodiments, after user device 110 receives the key code 185 generated by the code generation unit 175 of issuer system 121, App 139 of user device 110 displays the key code 185 to user 105 in the key code display 195. User 105 views the key code 185 and provides the key code 185 to recipient 115. In some embodiments, user 105 provides the key code 185 to recipient 115 either verbally, in writing, via text, or via some other form of communication. The key code 185 may be used by recipient 115 to redeem the monetary amount 187 donated by user 105.

In some embodiments, recipient 115 receives the key code 185 and either enters the key code 185 into App 140 of user device 125 (via a key code entry field 145), key-code application website 143 (via a key code entry field 144), or provides the key code 185 to a participating merchant 120. In some embodiments, when the recipient 115 provides the key code 185 to the merchant 120, the merchant 120 enters the key code 185 into a key code entry field 165 in App 155 of merchant system 122. In some embodiments, App 155 is similar to App 140 in that App 155 is configured to allow recipient 115 to redeem the monetary amount 187 using the key code 185, except that the bank account of merchant 120 associated with acquirer institution 160 receives the transfer of monetary amount 187 from issuer institution 150 upon validation of the key code 185. In some embodiments, merchant 120 may have access to App 155 via acquirer institution 160. Merchant system 122 is configured to receive key code 185 via App 155 and provide the key code 185 to issuer institution 150 via payment network 130 to redeem the monetary amount 187 associated with the key code 185.

In some embodiments, payment network 130 receives the key code 185 from merchant system 122 and transmits the key code 185 to issuer institution 150 for verification. In some embodiments, the issuer system 121 of issuer institution 150 receives the key code 185 and processes the key code 185 through a cryptographic hash function to verify that key code 185 maps to the private key 186. Examples of such cryptographic functions include, but are not limited to, SHA-1 (Secure Hash Algorithm-1) and SHA-256 (Secure Hash Algorithm-256). In some embodiments, when issuer institution 150 determines that the key code 185 does not map to the private key 186, monetary amount 187 is not transferred to the acquirer institution 160 associated with merchant 120 for use by recipient 115. In some embodiments, when issuer institution 150 determines that the key code 185 does map to the private key 186, the key code 185 is considered verified and a subsequent transfer request approval is transmitted to payment network 130 by issuer institution 150.

In some embodiments, issuer institution 150, which may be, for example, the issuer of a bank account associated with the App 139 and user 105, records the payment of the monetary amount 187 on a blockchain. In some embodiments, the blockchain may be, for example, a Visa Digi-Cash® blockchain or other type of distributed ledger. In some embodiments, since only the issuer institution 150 is privy to the private key 186 associated with the key code 185, only issuer institution 150 associated with the user 105 has permission to initiate the transfer of the monetary amount 187 reserved for fund transfer to the acquirer institution 160 or issuer institution 162. In some embodiments, acquirer institution 160 has issued a bank account associated with the merchant 120 and issuer institution 162 has issued a card account associated with the recipient 115 for dispersal of the monetary amount 187.

In some embodiments, payment network 130 receives the transfer request approval and initiates an automated clearing house (ACH) transfer from the issuer institution 150 to the acquirer institution 160 associated with merchant 120. The bank account associated with merchant 120 and acquirer institution 160 receives the transferred funds via payment network 130. In some embodiments, merchant 120 provides the monetary amount 187, in the form of cash or cash equivalent to recipient 115. In some embodiments, merchant 120 provides a store credit whose value is equivalent to the monetary amount 187 to recipient 115.

In some embodiments, when, instead of utilizing merchant 120 to redeem the monetary amount 187, recipient 115 utilizes the App 140 or key-code application website 143 to redeem the monetary amount 187, recipient 115 enters the key code 185 into key code entry field 145 of App 140 or key code entry field 144 in key-code application website 143. App 140 or key-code application website 143 provides the key code 185 to issuer institution 150 via payment network 130 for verification.

In some embodiments, as stated previously, the issuer system 121 of issuer institution 150 processes the key code 185 through a cryptographic hash function to verify that key code input by recipient 115 maps to the private key 186. Examples of such cryptographic functions include, but are not limited to, SHA-1 and SHA-256. In some embodiments, when issuer institution 150 determines that the key code entered by the recipient 115 does not map to the private key 186, the key code 185 is considered not verified and a subsequent transfer request approval is not transmitted to payment network 130 and no funds are transferred to the bank account or card account of recipient 115 at issuer institution 162 for use by recipient 115.

In some embodiments, when issuer institution 150 determines that the key code 185 input into key code entry field 145 or key code entry field 144 by recipient 115 does map to the private key 186, the key code 185 input by recipient 115 is considered verified and a subsequent transfer request approval is transmitted to payment network 130. Payment network 130 receives the transfer request approval and initiates an ACH transfer from the issuer institution 150 to the issuer institution 162 associated recipient 115. The bank account or card account associated with App 140 or key-code application website 143 and user device 125 receives the transferred monetary amount 187 from issuer institution 162 via payment network 130. The monetary amount 187 is then available for use by recipient 115.

FIG. 2 is an exemplary embodiment 200 of the user device 110 of FIG. 1 illustrating a user interface suitable for use with the key-code based money transfer system in accordance with some embodiments. In some embodiments, as stated previously, user device 110 includes camera 182, voice recorder 183, and App 139 that generates application display 135. Application display 135 allows user 105 to input monetary amount 187 and select the generate code button 191 to generate key code 185 for use by recipient 115 to redeem the monetary amount 187. In some embodiments, in addition to monetary amount field 190, generate code button 191, and key code display 195, Application display 135 includes a take-a-photo prompt 210, a take-a-voice-recording prompt 211, and a no-added-security prompt 213 that are configured to optionally allow the user 105 to invoke an added layer of security to the key-code based transaction process. For example, in some embodiments, the take-a-photo prompt 210 is configured to allow user 105 to utilize user device 110 to add a photo of the face of recipient 115 or biometric data associated with the photo of the face of recipient 115 to the key-code based money transfer process for a secured-photo verification enhancement to the key-code based money transfer system. In some embodiments, the take-a-voice-recording prompt 211 is configured to allow user 105 of user device 110 to add a voice recording of recipient 115 or biometric data associated with the voice recording of recipient 115 to the key-code based money transfer process for a secured-voice recording verification enhancement to the key-code based money transfer system. In some embodiments, the no-added-security prompt 213 is configured to allow user 105 of user device 110 to decline the use of a photo or voice recording of recipient 115 for secured-verification enhancement to the key-code based money transfer process.

In some embodiments, with reference to FIG. 1 and FIG. 2, user 105 selects generate code button 191 of user device 110 to generate key code 185. In some embodiments, upon selection of the generate code button 191, the take-a-photo prompt 210, the take-a-voice-recording prompt 211, and the no-added-security prompt 213 are displayed on application display 135 for optional selection by user 105. In some embodiments, the generate code button 191, the take-a-photo prompt 210, the take-a-voice-recording prompt 211, and the no-added-security prompt 213 are displayed on application display 135 for selection by user 105 upon selection of App 139. User 105 then has the option of selecting the take-a-photo prompt 210, the take-a-voice-recording prompt 211, or the no-added-security prompt 213 that is displayed on application display 135.

In some embodiments, when user 105 selects the no-added-security prompt 213, App 139 does not associate a photo or voice recording of recipient 115 with key code 185 and no added photo or voice recording security layer is applied the to key-code based money transfer technique. In some embodiments, when user 105 selects the take-a-photo prompt 210, user 105 is prompted to utilize camera 182 of user device 110 to take a photo of the face of recipient 115. After user 105 takes a photo of the face of recipient 115, App 139 associates the photo of the face of the recipient 115 or biometric data associated with the photo of the face of the recipient 115 taken by user 105 with the key code request 188 generated using the generate code button 191. In some embodiments, App 139 associates the photo of the face of the recipient taken by user 105 with the key code request 188 by assigning the photo a unique numeric or alphanumeric marker and tagging the key code request 188 and the photo with the unique numerical or alphanumerical marker indicative of a tag that represents the photo. In some embodiments, code generation unit 175 is configured to utilize the tagging of the photo (or voice recording and associated biometric data as described further with respect to FIG. 2) and the associated key code request 188 to allow recipient 115 to redeem the monetary amount 187 in the event that recipient 115 misplaces or does not remember the key code 185. For example, in some embodiments, by tagging the photo and the associated key code request 188 with the unique numeric or alphanumeric marker, when the recipient 115 forgets the key code 185, only a photo of recipient 115 is required to redeem the monetary amount 187 since the photo of recipient 115 taken for verification purposes is mapped to the key code 185 with the unique numeric or alphanumeric marker. In some embodiments, after the photo and key code request 188 are tagged by App 139, the photo is transmitted by App 139 to the issuer institution 150 along with the key code request 188.

Similarly, in some embodiments, when user 105 selects the take-a-voice-recording prompt 211, user 105 is prompted to utilize voice recorder 183 to record a voice recording of recipient 115. In some embodiments, App 139 may require the voice recording of recipient 115 be a pre-defined length or pre-defined set of words that correspond to a durational length threshold. The durational length threshold is an amount of time whose duration is such that the voice recognition software is capable of making an adequate comparison for voice recognition purposes. For example, recipient 115 may be required to state "Please record my voice" or "The ducks have landed" or some other phrase whose duration matches the durational length threshold requirement of App 139. App 139 associates the voice recording of the recipient 115 taken by user 105 with the key code request 188 generated using the generate code button 191. In some embodiments, App 139 associates either the voice recording of recipient 115 or biometric data associated with the voice recording with the key code 185 that is to be generated by code generation unit 175. In some embodiments, App 139 associates the voice recording of the recipient taken by user 105 with the key code 185 by assigning the voice recording a unique numeric or alphanumeric marker and tagging the key code request 188 with the unique numerical or alphanumerical marker indicative of a tag that represents the voice recording. In some embodiments, after the voice recording and key code request 188 are tagged by App 139, the voice recording is transmitted by App 139 to the issuer institution 150 along with the key code request 188.

In some embodiments, the issuer institution 150 receives the photo or voice recording of the recipient 115 and the key code request 188 and logs the photo, voice recording, or associated biometric data of recipient 115, and the key code request 188, with the key code 185 that is generated that corresponds to the key code request 188. In some embodiments, as part of the logging process, the photo, voice recording, and/or biometric data of the recipient 115, the key code request 188, and the key code 185 are stored in a database by the issuer system 121 in issuer institution 150 for secured verification of the key code 185 provided by the recipient 115. Code generation unit 175 of issuer institution 150 generates the key code 185 and transmits the key code 185 to the user 105. In some embodiments, user 105 provides the key code 185 to recipient 115 for redemption of the monetary amount 187 using merchant 120, App 140, or key-code application website 143.

In some embodiments, when the recipient 115 attempts to redeem the monetary amount 187 with the key code 185 using App 140 or key-code application website 143 on user device 125, App 140 or key-code application website 143 prompts recipient 115 to take a photo of the face of recipient 115 or record the voice of recipient 115. In some embodiments, when recipient 115 takes the photo or records the voice recording of recipient 115, App 140 provides the issuer institution 150 (via payment network 130) with the key code 185 and the photo of recipient 115, the voice recording of recipient 115, and/or the biometric data for verification.

Similarly, in some embodiments, when the recipient 115 attempts to redeem the funds with the key code 185 via merchant 120, merchant 120 uses App 155 of merchant system 122 (depicted in FIG. 1) to take a photo of the face of recipient 115 or a voice recording of recipient 115. App 155 of merchant 120 stores the photo of the face of recipient 115, the voice recording of recipient 115, and/or the biometric data associated with the photo of the face of recipient 115, the voice recording of recipient 115 and provides the issuer institution 150 (via payment network 130) with key code 185 and the photo of the face of recipient 115, the voice recording of recipient 115, and/or the biometric data associated with the photo of the face of recipient 115.

In some embodiments, issuer institution 150 receives the photo, voice recording, and/or associated biometric data of recipient 115 and conducts a security check using the associated photo, voice recording, or the biometric data of recipient 115. In some embodiments, issuer institution 150 conducts the security check by verifying that recipient 115 is the intended recipient and comparing the photo, voice recording, or associated biometric data to the stored photo, voice recording, or biometric data associated with the key code 185. In some embodiments, facial recognition software, voice recognition software, or biometric data recognition software is utilized by issuer institution 150 to verify that the photo of recipient 115, the voice recording of recipient 115, or biometric data of recipient 115 input at the user device 125 or merchant 120 is a match to the photo of recipient 115, the voice recording of recipient 115, or biometric data of recipient 115 input at user 105. The facial recognition software, voice recognition software, or biometric data recognition software at issuer institution 150 returns a match score indicative of the probability that the individual attempting to redeem the funds is the recipient 115 designated to receive the monetary amount 187 by user 105. In some embodiments, when issuer institution 150 is not able to perform facial recognition matching, voice recognition matching, or biometric data recognition matching, payment network 130 may conduct the facial recognition matching, voice recognition matching, or biometric data recognition matching for recipient 115 verification.

In some embodiments, when the match score is below a match indication threshold, the photo, voice recording, or biometric data input by recipient 115 is considered not a match and the issuer institution 150 does not release the monetary amount 187 to payment network 130 for use by recipient 115. In some embodiments, when the match score is above a match indication threshold, the photo, voice recording, or biometric data input by recipient 115 is considered a match and the issuer institution 150 releases the monetary amount 187 to payment network 130 for use by recipient 115. Payment network 130 then transfers the monetary amount 187 to the bank account or credit card account of recipient 115 or merchant 120 for disbursement to recipient 115.

In some embodiments, a unique key code (e.g., key code 185) may be generated by code generation unit 175 of issuer institution 150 using the biometric data of recipient 115. That is, in some embodiments, in order to generate the key code 185, the biometric data of the photo or voice recording associated with the recipient 115 is utilized by code generation unit 175 to generate the key code 185 by embedding the digital representation of the biometric data representative of the photo or voice recording into the key code 185 that is generated by the code generation unit 175. Embedding the biometric data into the generation of the key code 185 is an improvement over traditional key code generation techniques in that adding the biometric data into the key code 185 allows code generation unit 175 to generate a key code 185 that is unique to the biometric characteristics of only the recipient 115.

In some embodiments, when recipient 115 declines to have a photo or voice recording taken by merchant 120, App 140, or key-code application website 143, the issuer institution 150 may elect to use other risk management factors, such as the assessment of the key code 185, to determine whether to release the monetary amount 187 for payment to recipient 115 without using a match score. In some embodiments, when the monetary amount 187 is not released by issuer institution 150 within a specified period of time, e.g., a predetermined number of hours or days, the designated monetary amount 187 may be returned to bank account of user 105 by issuer institution 150.

In some embodiments, when recipient 115 redeems the monetary amount 187, recipient 115 may elect to receive the associated funds in, for example, the local fiat currency or cryptocurrency. In some embodiments, when recipient 115 elects to redeem the funds as fiat currency, the recipient 115 provides the key code 185 to App 140, key-code application website 143, or merchant 120. App 140, key-code application website 143, or merchant 120 transmits the key code 185 to the issuer institution 150 via the payment network 130. In some embodiments, when the key code provided by recipient 115 to redeem the monetary amount 187 maps to the key code 185 provided by user 105, the issuer institution 150 releases the reserved monetary amount 187 to payment network 130. Payment network 130 then facilitates the transferring of the monetary amount 187 to the bank or credit card account associated with recipient 115 or merchant 120 via, for example, a push payment or a credit transaction.

In some embodiments, when recipient 115 elects to redeem the monetary amount 187 in cryptocurrency, recipient 115 provides the key code 185 to the App 140, key-code application website 143, or participating merchant 120. The recipient 115 selects the desired cryptocurrency payment via App 140, key-code application website 143, or merchant 120. App 140, key-code application website 143, or merchant 120 transmits the key code 185 and the public cryptocurrency address of recipient 115 to payment network 130 and the issuer institution 150 via the payment network 130. In some embodiments, when the key code input by the recipient 115 maps to the key code 185 provided to user 105, the issuer institution 150 provides approval to payment network 130 to release the reserved cryptocurrency to the recipient 115. Payment network 130 facilitates the transfer of the cryptocurrency to the address of recipient 115 on the appropriate public cryptocurrency blockchain.

In some embodiments, when the recipient 115 does not redeem the monetary amount 187 or the request for the monetary amount 187 by recipient 115 is declined by issuer institution 150, the corresponding funds are returned to the user 105. In some embodiments, user 105 may cancel the monetary amount 187 transfer request in case of fraud. In some embodiments, in the case of fraud and when payment has been made to recipient 115 by issuer institution 150 in fiat currency, the issuer institution 150 may return the funds to the bank account of user 105. In some embodiments, when the monetary amount 187 was converted to cryptocurrency, the issuer institution 150 may request that the cryptocurrency that has been allocated on the public blockchain be converted to the fiat currency of recipient 115 and transmitted back to the issuer institution 150. Issuer institution 150 may then credit the bank account of recipient 115 with the appropriate monetary amount 187. In some embodiments, the monetary amount 187 returned to user 105 includes the movement in cryptocurrency to fiat conversion rates at the time the monetary amount 187 is returned to user 105.

FIG. 3 illustrates a method 300 for performing key-code based money transfers of FIG. 1 and FIG. 2 in accordance with some embodiments. The method, process steps, or stages illustrated in the figures may be implemented as an independent routine or process, or as part of a larger routine or process. Note that each process step or stage depicted may be implemented as an apparatus that includes a processor executing a set of instructions, a method, or a system, among other embodiments. In some embodiments, with reference to FIG. 1 and FIG. 2, at block 310, user 105 enters a monetary amount 187 into monetary amount field 190 of App 139 and uses generate code button 191 to request key code 185 associated with the monetary amount 187. For example, user 105 may input a monetary amount of $100.00, $200.00, $300.00, or some other monetary amount that indicates the amount of currency, funds, or financial equivalent that user 105 elects to have transferred to recipient 115. At block 320, App 139 requests key code 185 from code generation unit 175. At block 330, code generation unit 175 generates key code 185 and provides the key code 185 to key code display 195 of App 139 for view by user 105. In some embodiments, key code 185 is generated by code generation unit 175 using a photo, voice recording, and/or biometric data of the recipient 115 acquired using user device 110. In some embodiments, code generation unit 175 associates the key code 185 with a photo, voice recording, and/or biometric data of the recipient 115 such that the monetary amount 187 cannot be redeemed unless issuer institution 150 is able to match the photo, voice recording, and/or biometric data of the recipient 115.

At block 345, user 105 provides key code 185 to recipient 115 for access to the monetary amount 187. At block 350, the recipient 115, e.g., the recipient of the key code 185 from user 105, provides the key code 185 to merchant 120, key-code application website 143, or App 140 of user device 125. At block 360, when key code 185 is provided to App 140 or key-code application website 143, App 140 or key-code application website 143 provides the key code 185 to issuer institution 150 via payment network 130. At block 360, when key code 185 is provided to merchant 120, merchant 120 provides the key code 185 to App 155, which provides the key code 185 to issuer institution 150 via payment network 130.

At block 365, issuer institution 150 conducts a verification and security check of the key code 185. In some embodiments, the security check may include matching a photo, voice recording, and/or biometric data of the recipient received at App 140, key-code application website 143, or merchant 120. In some embodiments, at block 370, based on a positive result of the security check (e.g., a match of the key code and/or photo, voice recording, or biometric data) performed at block 365, payment network 130 initiates a transfer of the monetary amount 187 from issuer institution 150. Issuer institution 150 releases the monetary amount 187 to either acquirer institution 160 for transfer to the merchant 120 or issuer institution 162 for direct transfer to the bank account associated with recipient 115 and App 140. At block 380, recipient 115 (the recipient of the key code 185) receives the money associated with the monetary amount 187 (which, as stated previously, may be in the form of cash, credit, bitcoin, or other monetary representation) directly from the merchant 120, or via electronic transfer to the bank account associated with App 140 and issuer institution 162.

In various embodiments, a method includes inputting, at a first communication device, a money transfer amount indicative of an amount of funds to be transferred to a recipient and receiving, at the first communication device, a key code associated with the money transfer amount, wherein the key code alone is configured to allow the recipient to redeem the amount of funds.

In various embodiments, the method includes providing, to a first bank account, the amount of funds associated with money transfer amount based on the key code being entered into a key code entry field of a second communication device.

In various embodiments of the method, when the first bank account and the second communication device are associated with a merchant, the merchant provides cash or credit equivalent to the money transfer amount to the recipient.

In various embodiments of the method, when the first bank account and the second communication device are associated with the recipient, the recipient is able to withdraw from the first bank account the amount of funds that are equivalent to the money transfer amount.

In various embodiments of the method, in addition to the key code, a recipient-based-security-enhancement that is based on characteristics of the recipient is used to redeem the amount of funds.

In various embodiments of the method, the recipient-based-security-enhancement includes a photograph, voice, or biometric data of the recipient.

In various embodiments, the method includes providing the key code to a first computer via a payment network to signal to a first issuer institution associated with the first computer to release the amount of funds associated with the money transfer amount.

In various embodiments of the method, a code generation unit, located at the first communication device or the first computer, generates the key code.

In various embodiments, a system includes a processor and a non-transitory computer readable medium coupled to the processor, the non-transitory computer readable medium comprising code, that when executed by the processor, causes the processor to receive input of a money transfer amount indicative of an amount of funds to transfer to a recipient and generate a key code associated with the money transfer amount, the key code being programmed to enable the recipient to redeem the amount of funds associated with the money transfer amount.

In various embodiments of the system, based upon generation of the key code by the processor, the key code is provided to the recipient by a user of the system for redemption of the amount of funds associated with the money transfer amount.

In various embodiments of the system, the code, when executed by the processor, further causes the processor to generate the key code associated with the money transfer amount based on unique photographic, voice, or biometric characteristics of the recipient.

In various embodiments of the system, the code, when executed by the processor, further causes the processor to provide, to a bank account associated with the recipient, the amount of funds associated with money transfer amount based on the key code being provided to the recipient.

In various embodiments of the system, the code, when executed by the processor, further causes the processor to provide, to a bank account associated with a merchant, the amount of funds associated with money transfer amount based on the key code being provided to the merchant by the recipient.

In various embodiments of the system, the merchant is able to provide cash or merchant credit to the recipient based on reception of the key code from the recipient.

In various embodiments of the system, the processor receives the key code provided to the recipient via a payment network, the key code being used to signal a release of the amount of funds associated with the money transfer amount.

In various embodiments, an application includes a monetary amount field and a key code display associated with a monetary amount that is input into the monetary amount field, wherein, based upon a generation of a key code associated with the monetary amount input into the monetary amount field, a user privy to the key code is able to ascertain funds associated with the monetary amount.

In various embodiments of the application, in addition to the key code, a user-based-security-enhancement based on characteristics of the user privy to the key code is used to redeem the funds.

In various embodiments of the application, the user-based-security-enhancement includes a photograph, voice, or biometric data of the user privy to the key code.

In various embodiments of the application, the funds associated with the key code are available in a form of currency or credit from a merchant.

In various embodiments of the application, the funds associated with the key code are transferred to a bank account associated with a user application.

In some embodiments, certain aspects of the techniques described above may implemented by one or more processors of a processing system executing software or software applications. In some embodiments, the software comprises one or more sets of executable instructions stored or otherwise tangibly embodied on a non-transitory computer readable storage medium. In some embodiments, the software or software applications can include the instructions and certain data that, when executed by the one or more processors, manipulate the one or more processors to perform one or more aspects of the techniques described above. In some embodiments, the non-transitory computer readable storage medium can include, for example, a magnetic or optical disk storage device, solid state storage devices such as Flash memory, a cache, random access memory (RAM) or other non-volatile memory device or devices, and the like. In some embodiments, the executable instructions stored on the non-transitory computer readable storage medium may be in source code, assembly language code, object code, or other instruction format that is interpreted or otherwise executable by one or more processors.

In some embodiments, a computer readable storage medium may include any storage medium, or combination of storage media, accessible by a computer system during use to provide instructions or data, or combination thereof, to the computer system. In some embodiments, such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectro-mechanical systems (MEMS)-based storage media. In some embodiments, the computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

For purposes of the description, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

What is claimed is:
1. A system, comprising:
a processor; and
a non-transitory computer readable medium coupled to the processor, the non-transitory computer readable medium comprising code, that when executed by the processor, causes the processor to:
generate an application on a touch screen that allows a user of the system to initiate a key-code based money transfer by selecting and logging into the application;
generate an application display on the touch screen that allows the user of the system to input a money transfer amount;
receive input of the money transfer amount indicative of an amount of funds to transfer to a recipient;
receive a photo of the recipient captured utilizing a take-a-photo prompt selected by the user; and
generate a key code associated with the money transfer amount, the key code being programmed to enable the recipient to redeem the amount of funds associated with the money transfer amount, wherein the key code is generated based on a unique photographic characteristic of the photo of the recipient and wherein, the photo containing the unique photographic characteristic is assigned a unique alphanumeric number, and the photo and a key code request associated with the key code are tagged with the unique alphanumeric number in order to redeem the money transfer amount.

2. The system of claim 1, wherein:
based upon generation of the key code by the processor, the key code is provided to the recipient by a user of the system for redemption of the amount of funds associated with the money transfer amount.

3. The system of claim 2, wherein the code, when executed by the processor, further causes the processor to:
generate the key code associated with the money transfer amount based on unique voice, or biometric characteristics of the recipient.

4. The system of claim 2, wherein the code, when executed by the processor, further causes the processor to:
provide, to a bank account associated with the recipient, the amount of funds associated with money transfer amount based on the key code being provided to the recipient.

5. The system of claim 2, wherein the code, when executed by the processor, further causes the processor to:
provide, to a bank account associated with a merchant, the amount of funds associated with money transfer amount based on the key code being provided to the merchant by the recipient.

6. The system of claim 5, wherein:
the merchant is able to provide cash or merchant credit to the recipient based on reception of the key code from the recipient.

7. The system of claim 6, wherein:
the processor receives the key code provided to the recipient via a payment network, the key code being used to signal a release of the amount of funds associated with the money transfer amount.

* * * * *